(12) United States Patent
Kanbara et al.

(10) Patent No.: US 8,816,040 B2
(45) Date of Patent: Aug. 26, 2014

(54) POLYMER DYE

(75) Inventors: Takaki Kanbara, Tsukuba (JP); Junpei Kuwabara, Tsukuba (JP); Hikaru Yamada, Tsukuba (JP); Nobutaka Fujimoto, Himeji (JP)

(73) Assignees: University of Tsukuba, Tsukuba-shi (JP); Sumitomo Seika Chemicals Co., Ltd., Kako-gun (JP)

( * ) Notice: Subject to any disclaimer, the term of this patent is extended or adjusted under 35 U.S.C. 154(b) by 101 days.

(21) Appl. No.: 13/461,933

(22) Filed: May 2, 2012

(65) Prior Publication Data

US 2012/0329978 A1 Dec. 27, 2012

(30) Foreign Application Priority Data

Jun. 24, 2011 (JP) ................ 2011-140310

(51) Int. Cl.
*C08G 73/06* (2006.01)

(52) U.S. Cl.
USPC ............ 528/223; 8/554; 8/555; 8/558; 8/564; 8/647; 528/332

(58) Field of Classification Search
USPC ........ 8/554, 555, 558, 564.647; 528/223, 332
See application file for complete search history.

(56) References Cited

FOREIGN PATENT DOCUMENTS

| JP | 2000-178478 | 6/2000 |
| JP | 2009-164029 | 7/2009 |
| JP | 2010-050598 | 3/2010 |

OTHER PUBLICATIONS

Minoru Kukino et al. "Synthesis and Metal-like Luster of Novel Polyaniline Analogs Containing Azobenzene Unit", Chemistry Letters, vol. 39, No. 12, pp. 1248-1250, Dec. 5, 2010.
Graduation thesis/paper of Presentation at University for graduation ( 5 pages).
Graduation thesis/paper of Presentation at University for graduation ( 5 pages). Feb. 10, 2011.

*Primary Examiner* — Gregory Listvoyb
(74) *Attorney, Agent, or Firm* — Oblon, Spivak, McClelland, Maier & Neustadt, L.L.P.

(57) ABSTRACT

A polymer dye has repeating units of formula (I):

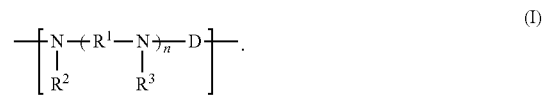

Each of $R^1$, $R^2$, and $R^3$ is independently a monocyclic carbocyclic group, a condensed polycyclic carbocyclic group, a monocyclic heterocyclic group, or a condensed polycyclic heterocyclic group. In any case, each of $R^1$, $R^2$, and $R^3$ independently may have a substituent. $R^1$ is a divalent group, and $R^2$ and $R^3$ are monovalent groups. D is an organic dye group and n is an integer of from 0 to 10. The polymer dye has a number-average molecular weight of from 500 to 500,000. The dye can be a component in a film. The dye can also be included in various industrial materials in automobiles; communication instruments, such as mobile phones, PDA, remote controllers, mobile information terminals, electronic dictionaries, and electronic organizers; home electric appliances; construction parts; and the like.

8 Claims, 3 Drawing Sheets

POLYMER DYE

TECHNICAL FIELD

The present invention relates to a polymer dye which can be used in various industrial materials for use in automobiles, communication instruments, such as mobile phones, PDA, remote controllers, mobile information terminals, electronic dictionaries, and electronic organizers, home electric appliances, construction parts, and the like, a method for producing the polymer dye, a film containing the polymer dye.

BACKGROUND ART

Presently, various parts such as those in automobile field, various home electric appliances and construction parts are desired to have designability and decorativeness in addition to their functions, so that the parts are subjected to various decorative carvings.

Among them, materials having metallic luster having high brightness have been used in various applications as decorative carving materials with high-grade feel.

As the materials having metallic luster, for example, a material having metallic luster containing a metal such as aluminum, gold or silver has been disclosed (see, Patent Publication 1). In addition, as a material having metallic luster not containing a metal, luster films using color development based on a inclined multi-layered structure have been disclosed (see, Patent Publications 2 and 3).

PRIOR ART PUBLICATIONS

Patent Publications

Patent Publication 1: Japanese Patent Laid-Open No. 2000-178478
Patent Publication 2: Japanese Patent Laid-Open No. 2009-164029
Patent Publication 3: Japanese Patent Laid-Open No. 2010-050598

SUMMARY OF THE INVENTION

Problems to be Solved by the Invention

However, in cases of a material containing a metal, the material does not transmit electromagnetic waves, so that utilization to various wireless communication instruments would be greatly limited in ubiquitous society in which information communication networks and communication services are developed. In addition, in a case of a material based on an inclined multi-layered structure, since fine rugged structures and arrangements of a size equal to or smaller than the wavelength of light are necessitated, there are some disadvantages that high levels of laminate techniques are required, and that the color is limited to silver alone.

In addition, in a plating treatment which is a representative method for decorative carving of a metallic luster, there is a disadvantage that a treatment of waste liquids containing heavy metals in large amounts is necessitated; on the other hand, in a case without using a chemical, there is a disadvantage that an expensive vacuum thin film coating system such as magnetron sputtering is necessitated.

An object of the present invention is to provide a polymer dye capable of exhibiting a metallic luster of a variety of colors without containing any metals, thereby making it possible to form a film with a simple and convenient method, a method for producing the polymer dye, and a film containing the polymer dye.

Means to Solve the Problems

As a result of intensive studies in order to solve the above mentioned objects, the present inventors have found that a polymer dye capable of exhibiting a metallic luster of a variety of colors depending upon the kinds of organic dyes is obtained by incorporating an organic dye into a polymer main chain having a specified repeating unit as a constituent, and the present invention has been perfected thereby.

The present invention relates to:

[1] a polymer dye having a repeating unit represented by the formula (I):

wherein each of $R^1$, $R^2$, and $R^3$, which may be identical or different, is a monocyclic carbocyclic group which may have a substituent, a condensed polycyclic carbocyclic group which may have a substituent, a monocyclic heterocyclic group which may have a substituent, or a condensed polycyclic heterocyclic group which may have a substituent, wherein $R^1$ is a divalent group, and $R^2$ and $R^3$ are monovalent groups; D is an organic dye group; and n is an integer of from 0 to 10, the polymer dye having a number-average molecular weight of from 500 to 500,000;

[2] a method for producing a polymer dye having a repeating unit represented by the formula (I):

wherein each of $R^1$, $R^2$, and $R^3$, which may be identical or different, is a monocyclic carbocyclic group which may have a substituent, a condensed polycyclic carbocyclic group which may have a substituent, a monocyclic heterocyclic group which may have a substituent, or a condensed polycyclic heterocyclic group which may have a substituent, wherein $R^1$ is a divalent group, and $R^2$ and $R^3$ are monovalent groups; D is an organic dye group; and n is an integer of from 0 to 10, the polymer dye having a number-average molecular weight of from 500 to 500,000, characterized in that the method comprises the steps of reacting an amino compound represented by the formula (II):

wherein $R^1$, $R^2$, $R^3$ and n are as defined above, and a dihalogeno-compound represented by the formula (III):

wherein D is as defined above; and X is a halogen atom,
in the presence of a catalyst containing a palladium compound and a phosphine compound, and a base; and

[3] a film containing the polymer dye as defined in the above [1].

Effects of the Invention

The polymer dye of the present invention is a polymer dye capable of exhibiting a metallic luster of a variety of colors without containing any metals, so that an effect that a film can be formed therefrom by a simple and convenient method is exhibited. Since the polymer dye of the present invention does not contain any metals, the conventional problems of transmittance of the electromagnetic waves and environmental loads during the production processes can be solved, and decorative carving of metallic texture in the applications where corrosion of metals is problematic can be accomplished.

MODES FOR CARRYING OUT THE INVENTION

Figure 1:
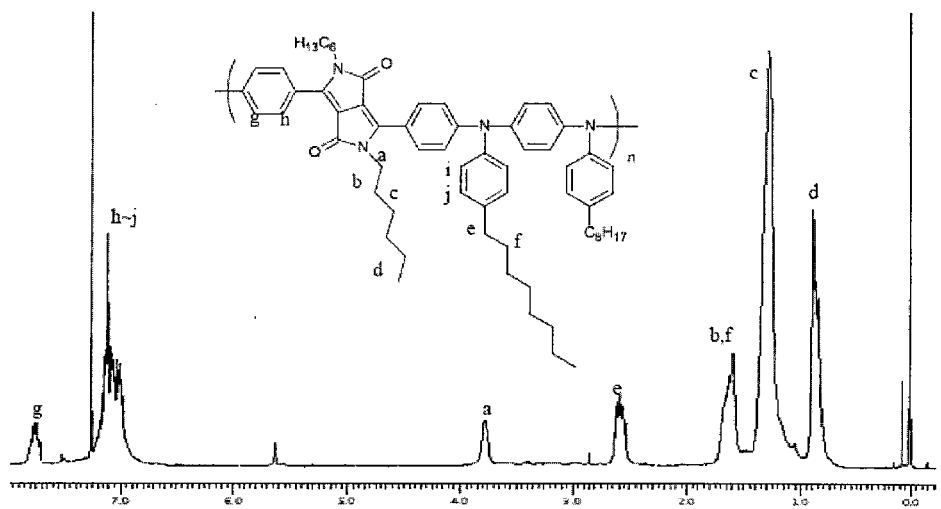
[FIG. 1] A $^1$H NMR spectrum of a polymer dye (1-1) obtained in Example 1.

The polymer dye of the present invention is a polymer compound having a repeating unit represented by the formula (I):

wherein each of $R^1$, $R^2$, and $R^3$, which may be identical or different, is a monocyclic carbocyclic group which may have a substituent, a condensed polycyclic carbocyclic group which may have a substituent, a monocyclic heterocyclic group which may have a substituent, or a condensed polycyclic heterocyclic group which may have a substituent, wherein $R^1$ is a divalent group, and $R^2$ and $R^3$ are monovalent groups; D is an organic dye group; and n is an integer of from 0 to 10.

The polymer dye of the present invention is capable of exhibiting a metallic luster of a variety of colors, depending upon the kinds of the organic dyes to be incorporated into a polymer. Although the detailed reasons why the polymer dye obtained by the present invention exhibits a metallic luster of a variety of colors are not elucidated, it is presumably due to fact that high coefficients of absorbance of the organic dye and the formation of intramolecular charge transfer complex in the polymer main chain are involved.

In addition, since the polymer dye of the present invention does not contain any metals, the polymer dye has some features that the conventional problems of transmittance of the electromagnetic waves and environmental loads during the production processes can be solved, and that decorative carving of metallic texture in the applications where corrosion of metals is problematic can be made. Therefore, a metallic luster can be provided to various industrial materials using the polymer dye of the present invention, especially those for use in automobiles, communication instruments, such as mobile phones, PDA, remote controllers, mobile information terminals, electronic dictionaries, and electronic organizers, home electric appliances, construction parts, and the like, and a high-grade feel can be increased, whereby designability and decorativeness can be remarkably improved.

The polymer dye of the present invention has a number-average molecular weight of from 500 to 500,000, preferably from 1,000 to 100,000, more preferably from 2,000 to 50,000, and even more preferably from 2,000 to 10,000. When the polymer dye has a number-average molecular weight of less than 500, there is a risk that film formability would be insufficient upon use of the polymer dye. In addition, the polymer dye has a number-average molecular weight exceeding 500,000, solubility to a solvent would be insufficient upon the preparation of a solution of a polymer dye, so that there is a risk of being difficult to be used as a film raw material.

In addition, the polymer dye of the present invention has a weight-average molecular weight of preferably from 500 to 1,000,000, more preferably from 1,000 to 200,000, and even more preferably from 2,000 to 50,000, from the viewpoint of durability upon use of the polymer dye.

In the formula (I), each of $R^1$, $R^2$ and $R^3$, which may be identical or different, is a monocyclic carbocyclic group which may have a substituent, a condensed polycyclic carbocyclic group which may have a substituent, a monocyclic heterocyclic group which may have a substituent, or a condensed polycyclic heterocyclic group which may have a substituent, wherein $R^1$ is a divalent group, and $R^2$ and $R^3$ are monovalent groups.

The monocyclic carbocyclic group is preferably a monocyclic carbocyclic group having 3 to 10 carbon atoms. The monocyclic carbocyclic group, in a case of a monovalent group, includes a cyclopropyl group, a cyclohexyl group, a phenyl group, and the like. Also, the monocyclic carbocyclic group, in a case of a divalent group, includes a cyclopropylene group, a cyclohexylene group, a phenylene group, and the like.

The condensed polycyclic carbocyclic group is preferably a condensed polycyclic carbocyclic group in which 2 to 10 carbocyclic rings are condensed. The condensed polycyclic carbocyclic group, in a case of a monovalent group, includes a naphthyl group, an anthryl group, a pyrenyl group, a pentalenyl group, an indenyl group, an azulenyl group, a heptalenyl group, an acenaphthyl group, a fluorenyl group, a phenalenyl group, a phenanthryl group, a fluoranthenyl group, a triphenylenyl group, a perillenyl group, a chrysenyl group, a picenyl group, a pentacenyl group, a coronelyl group, an ovalenyl group, and the like. Also, the condensed polycyclic carbocyclic group, in a case of a divalent group, includes a naphthylene group, an anthrylene group, a pyrenylene group, a pentalenylene group, an indenylene group, an azulenylene group, a heptalenylene group, an acenaphthylene group, a fluorenylene group, a phenalenylene group, a phenanthrylene group, a fluoranthenylene group, a triphenylenylene group, a perillenylene group, a chrysenylene group, a picenylene group, a pentacenylene group, a coronelylene group, an ovalenylene group, and the like.

The monocyclic heterocyclic group, in a case of a monovalent group, includes a pyridyl group, a pyrimidinyl group, a furyl group, a thiophenyl group, a pyrazinyl group, a pyridazinyl group, and the like. Also, the monocyclic heterocyclic group, in a case of a divalent group, includes a pyridylene group, a pyrimidinylene group, a furylene group, a thiophenylene group, a pyrazinylene group, a pyridazinylene group, and the like.

The condensed polycyclic heterocylic group, in a case of a monovalent group, includes a quinolyl group, a benzofuranyl group, an isobenzofuranyl group, a 1-benzothiophenyl group, a 2-benzothiophenyl group, a carbazolyl group, a xanthenyl group, an isoquinolyl group, an acridinyl group, a quinoxalinyl group, a coumarinyl group, and the like. Also, the condensed polycyclic heterocyclic group, in a case of a divalent group, includes a quinolylene group, a benzofuranylene group, an isobenzofuranylene group, a 1-benzothiophenylene group, a 2-benzothiophenylene group, a carbazolylene group, a xanthenylene group, an isoquinolylene group, an acridinylene group, a quinoxalinylene group, a coumarinylene group, and the like.

The substituents which the monocyclic carbocyclic group, the condensed polycyclic carbocyclic group, the monocyclic heterocyclic group, and the condensed polycyclic heterocyclic group can have include alkyl groups having 1 to 10 carbon atoms, alkoxy groups having 1 to 10 carbon atoms, alkanoyl groups having 1 to 10 carbon atoms, a carbamoyl group, a cyano group, and the like.

The alkyl groups having 1 to 10 carbon atoms include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, an isohexyl group, an n-octyl group, an n-decyl group, and the like.

The alkoxy groups having 1 to 10 carbon atoms include a methoxy group, an ethoxy group, and the like.

The alkanoyl groups having 1 to 10 carbon atoms include a methanoyl group, an ethanoyl group, Each of $R^1$, $R^2$ and $R^3$ is preferably a monocyclic carbocyclic group which may have a substituent, from the viewpoint of film formability of the polymer dye.

In the formula (I), D is an organic dye group.

In the present invention, the organic dye is a compound that has an absorption maximum wavelength in the wavelength range of from 250 to 1500 nm, and contains a π electron conjugate compound that interacts, i.e. absorbs, emits, or the like, with ultraviolet rays to near infrared rays. In the present invention, the compound group corresponds to an organic dye group represented by D in the above-mentioned formula (I), so long as the group of the compound has the features described above, irrespective of the chemical structures themselves.

Specific examples of the organic dye group include divalent groups of organic dyes, such as diketopyrrolopyrrole, squalene, carotene, xanthophyll, cryptoxanthin, zeaxanthin, fucoxanthin, licopene, lutein, anthocyan, catechin, naphthoquinone, anthraquinone, naphthacene, anthracene, pentacene, acridine, alizarin, indigo, isoindigo, curcumin, crocetin, genistein, cochineal, hypericin, purpurin, berberine, litmus, porphyrin, phthalocyanine, and coumarin. Among these organic dye groups, the divalent groups of diketopyrrolopyrrole, squalene, anthraquinone, isoindigo, naphthacene, anthracene, and pentacene are preferred, from the viewpoint of facilitation of dihalogenation, and at least one divalent group selected from the group consisting of diketopyrrolopyrrole, squalene, anthraquinone, and isoindigo is more preferred, from the viewpoint of being readily available and easy to produce.

In the formula (I), n is from 0 to 10, preferably from 0 to 5, and more preferably from 0 to 2.

The repeating unit represented by the formula (I) is preferably a repeating unit represented by the formula (Ia):

wherein $R^2$ and D are as defined above,
in which n is 0 in the above formula,
from the viewpoint of the metallic luster of the polymer dye, and also similarly, the repeating unit is more preferably a repeating unit represented by the formula (Ib):

wherein $R^1$, $R^2$, $R^3$ and D are as defined above,
in which n is 1 in the above formula, from the viewpoint of the metallic texture of the polymer dye.

The polymer dye of the present invention can be produced by reacting an amino compound represented by the formula (II):

wherein $R^1$, $R^2$, $R^3$ and n are as defined above, and
a dihalogeno compound represented by the formula (III):

 (III)

wherein X is a halogen atom; D is as defined above,
in the presence of a catalyst and a base.

Specific examples of the amino compound represented by the formula (II) include aniline, 2-methylaniline, 3-methylaniline, 4-methylaniline, 2-ethylaniline, 3-ethylaniline, 4-ethylaniline, 2-n-butylaniline, 3-n-butylaniline, 4-n-butylaniline, 2-n-octylaniline, 3-n-octylaniline, 4-n-octylaniline, 2-n-decylaniline, 3-n-decylaniline, 4-n-decylaniline, N,N'-bisphenyl-1,4-phenylenediamine, N,N'-bis(2-methylphenyl)-1,4-phenylenediamine, N,N'-bis(4-methylphenyl)-1,4-phenylenediamine, N,N'-bis(2-ethylphenyl)-1,4-phenylenediamine, N,N'-bis(4-methylphenyl)-1,4-phenylenediamine, N,N'-bis(2-n-butylphenyl)-1,4-phenylenediamine, N,N'-bis(4-n-butylphenyl)-1,4-phenylenediamine, N,N'-bis(2-n-octylphenyl)-1,4-phenylenediamine, N,N'-bis(4-n-octylphenyl)-1,4-phenylenediamine, N,N'-bis(2-n-decylphenyl)-1,4-phenylenediamine, N,N'-bis(4-n-decylphenyl)-1,4-phenylenediamine, and the like. Among them, 4-n-octylaniline, 4-n-decylaniline, N,N'-bis(4-n-octylphenyl)-1,4-phenylenediamine, and N,N'-bis(4-n-decylphenyl)-1,4-phenylenediamine are preferred, from the viewpoint of ease in availability and excellent film-forming ability upon use of the polymer dye.

In the above-mentioned (III), the halogen atom represented by X includes a fluorine atom, a chlorine atom, a bromine atom, an iodine atom, and the like, and the bromine atom is preferred, from the viewpoint of increasing reactivity of the dihalogeno compound.

The dihalogeno compound represented by the formula (III) is obtained by dihalogenation in the presence of sulfur dioxide, dihalogenation in the presence of a simple element of antimony, titanium, tin or zinc or a compound thereof as a catalyst, and the like.

The amount of the amino compound represented by the formula (II) used is not particularly limited, and the amount of the amino compound used, per one mol of the dihalogeno compound represented by the formula (III), is preferably 0.5 mol or more, from the viewpoint of smoothly progressing the reaction, and the amount used is preferably 1.5 mol or less, from the viewpoint of obtaining an effect corresponding to the amount used. From these viewpoints, the amount of the amino compound represented by the formula (II) used is preferably from 0.5 to 1.5 mol, and more preferably from 0.9 to 1.1 mol, per one mol of the dihalogeno compound represented by the formula (III).

The reaction can be more efficiently accelerated by carrying out the reaction in the presence of a catalyst system having a larger tolerance to functional groups and being strong against steric hindrance. From the above viewpoint, in the present invention, it is preferable to use, as a catalyst, a catalyst containing a palladium compound and a phosphine compound.

The palladium compound is not particularly limited, and the palladium compound includes palladium(IV) compounds such as sodium hexachloropalladate(IV) tetrahydrate and potassium hexachloropalladate(IV); palladium(II) compounds such as palladium(II) chloride, palladium(II) bromide, palladium(II) acetate, palladium(II) acetylacetonate, dichlorobis(benzonitrile)palladium(II), dichlorobis(acetonitrile)palladium(II) dichlorobis(triphenylphosphine)palladium(II), dichlorobis(tri-o-tolylphosphine)palladium(II), dichlorotetrammine palladium(II), dichloro(cycloocta-1,5-diene)palladium(II), palladium(II) trifluoroacetate; palladium(0) compounds such as tris(dibenzylidene acetone) dipalladium(0), tris(dibenzylidene acetone) dipalladium-chloroform complex(0), and tetrakis(triphenylphosphine) palladium(0). Among them, the palladium(0) compounds are preferred, from the viewpoint of having high reaction activity, and tris(dibenzylidene acetone) dipalladium(0) has the highest reaction activity and is suitably used. These palladium compounds may be used alone or in a combination of two or more kinds.

The amount of the palladium compound used, calculated as palladium per one mol of the dihalogeno compound, is preferably 0.0001 mol or more, from the viewpoint of smoothly progressing the reaction, and the amount of the palladium compound used is preferably 0.2 mol or less, from the viewpoint of obtaining an effect corresponding to the amount used. From these viewpoints, the amount of the palladium compound used, calculated as palladium per one mol of the dihalogeno compound, is preferably from 0.0001 to 0.2 mol, and more preferably from 0.0002 to 0.05 mol.

The phosphine compound is not particularly limited, and the phosphine compound includes phosphine compounds having chelating ability as a ligand, such as tri-tert-butylphosphine tetrafluoroborate, triethylphosphine, tri-tert-butylphosphine, triphenylphosphine, 2,2'-bis(diphenylphosphino)-1,1'-binaphthyl, 1,1'-bis(diphenylphosphino)ferrocene, N,N'-dimethyl-1-[1',2-bis(diphenylphosphino)ferrocenyl], and 9,9-dimethyl-4,5-bis(diphenylphosphino)xanthene. Among them, tri-tert-butylphosphine tetrafluoroborate, 2,2'-bis(diphenylphosphino)-1,1'-binaphthyl, and 9,9-dimethyl-4,5-bis(diphenylphosphino)xanthene are preferred, from the viewpoint of having high reaction activities. These phosphine compounds may be used alone or in a combination of two or more kinds.

The amount of the phosphine compound used, per one mol of the palladium compound, is preferably 0.1 mol or more, from the viewpoint of smoothly progressing the reaction, and the amount of the palladium compound used is preferably 20 mol or less, from the viewpoint of obtaining an effect corresponding to the amount used. From these viewpoints, the amount of the phosphine compound used, per one mol of the palladium compound, is preferably from 0.1 to 20 mol, and more preferably from 0.5 to 10 mol.

In the present invention, the palladium compound and the phosphine compound mentioned above may be each added alone to a reaction system, or these compounds which are previously prepared in the form of a complex may be added to a reaction system.

In the present invention, the base used in the above-mentioned reaction is not particularly limited, and the base includes alkali metal alkoxides, such as sodium methoxide, sodium ethoxide, potassium methoxide, potassium ethoxide, lithium-tert-butoxide, sodium-tert-butoxide, and potassium-tert-butoxide, and the like. Here, these bases may be used alone or in a combination of two or more kinds. In addition, each of the bases may be directly added to a reaction system, or those prepared from an alkali metal, an alkali metal hydride, and an alkali metal hydroxide, and a corresponding alcohol may be added to a reaction system.

The amount of the base used is preferably 2 mol or more, per one mol of the dihalogeno compound, from the viewpoint of preventing the lowering of the yield, and the amount of the base used is preferably 30 mol or less, from the viewpoint of obtaining an effect corresponding to the amount used. From these viewpoints, the amount of the base used is preferably from 2 to 30 mol, and more preferably from 2 to 10 mol, per one mol of the dihalogeno compound.

In the present invention, the solvent used in the above-mentioned reaction as occasion demands is not particularly limited, so long as the solvent is an inactive solvent to the above reaction, and the solvent includes, for example, aromatic hydrocarbon-based solvents such as benzene, toluene, and xylene; ether-based solvents such as diethyl ether, tetrahydrofuran, and dioxane; acetonitrile, dimethylformamide, dimethyl sulfoxide, hexamethylphosphotriamide, and the like. Among them, toluene and xylene are preferred because recycling of the solvents is facilitated.

The amount of the solvent used is not particularly limited, and the amount is preferably from 200 to 5,000 parts by mass, based on 100 parts by mass of the amino compound, from the viewpoint of smoothly progressing the reaction, and from the viewpoint of obtaining an effect corresponding to the amount used.

The atmosphere during the reaction is not particularly limited. The atmosphere may be the air, or an inert gas including, for example, a nitrogen gas.

The reaction temperature is not particularly limited, and the reaction temperature is preferably 20° C. or higher, from the viewpoint of controlling the reaction time, and the reaction temperature is 250° C. or lower, from the viewpoint of preventing the lowering of the yield due to side reactions. From these viewpoints, the reaction temperature is preferably from 20° to 250° C., and more preferably from 50° to 150° C. Although the reaction time cannot be unconditionally determined because the reaction time differs depending upon the reaction temperature, it is preferable that the reaction time is usually 1 to 72 hours or so.

The polymer dye of the present invention thus obtained can be isolated by filtration, washing to remove the catalysts and the like, and thereafter drying.

The film containing the polymer dye of the present invention is obtained without using a high-level lamination technique. For example, a thin film having a metallic luster can be produced by dissolving the polymer dye in a solvent such as a chloroform, and carrying out a simple and convenient method such as casting or coating or the like. The film has a thickness of preferably from 10 to 200 µm, and more preferably from 20 to 120 µm, from the viewpoint of durability upon the use of the polymer dye and flexibility of the film produced by using the polymer dye.

EXAMPLES

The present invention will be explained more specifically by means of Examples, without intending to limit the present invention to these Examples.

Example 1

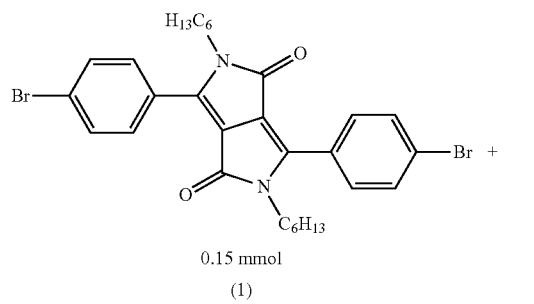

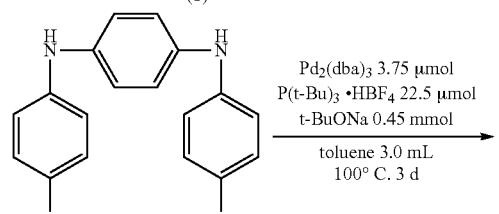

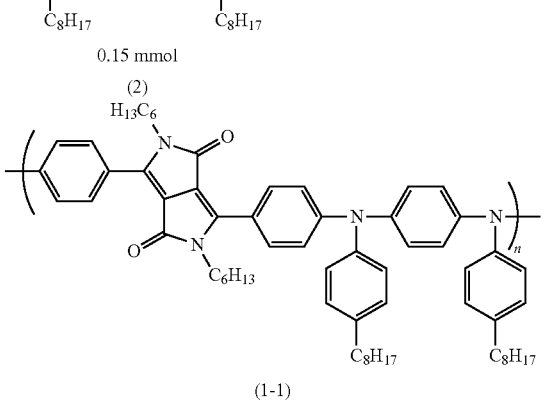

A 5-mL Schlenk flask equipped with a condensing tube, a thermometer, and a stirrer was charged with 92.2 mg (0.15 millimoles) of a diketopyrrolopyrrole (DPP) derivative (1), 72.7 mg (0.15 millimoles) of N,N'-bis(4-n-octylphenyl)-1,4-phenylenediamine (2), 3.4 mg (3.75 micromoles) of tris(dibenzylidene acetone)dipalladium(0) (Pd$_2$(dba)$_3$), 6.5 mg (22.5 micromoles) of tri-tert-butylphosphine tetrafluoroborate (P(t-Bu)$_3$·HBF$_4$), 43.2 mg (0.45 millimoles) of sodium-tert-butoxide (t-BuONa) and 3.0 mL of toluene. Next, the contents were heated to 100° C. under a nitrogen atmosphere, and the components were reacted at the same temperature for 3 days. The liquid reaction mixture was then cooled to room temperature, and poured to 10 mL of methanol, to precipitate out a polymer. Thereafter, the precipitates were separated by filtration, and washed sequentially with ethylenediaminetetraacetic acid (EDTA), pure water, methanol, and hexane, and the washed precipitates were dried under a reduced pressure, to give a purple polymer dye (1-1) (solid, 140.2 mg). The yield of the resulting polymer dye was 100% based on the diketopyrrolopyrrole derivative used. In addition, the resulting polymer dye had a number-average molecular weight of 5,900, and a weight-average molecular weight of 8,900. Here, the number-average molecular weight and the weight-average molecular weight were measured in chloroform containing LiBr (0.01 mol/L) at 30° C. by using gel permeation chromatography (Tosoh Corporation, trade name: HLC-8020), and calculated using standard polystyrenes as the reference.

The structure of the resulting polymer dye (1-1) was identified according to $^1$H NMR. The $^1$H NMR spectrum of the polymer dye (1-1) is shown in FIG. 1. Here, the $^1$H NMR spectrum was obtained by taking measurements at room temperature in deuterated chloroform by using Model JNM-ECS-400 (400 MHz) manufactured by JEOL.

$^1$H NMR (CDCl$_3$, 400 MHz) δ 7.78-7.70 (m, 4H, DPP), 7.19-6.98 (br, 18H, DPP, phenylenediamine), 3.77-3.76 (br, 4H, N—CH$_2$), 2.61-2.53 (m, 4H, Ar—CH$_2$), 1.65-1.61 (m, 8H, N—CH$_2$—CH$_2$, Ar—CH$_2$—CH$_2$), 1.38-1.17 (br, 32H, CH$_2$), 0.89-0.84 (m, 12H, CH$_3$)

Example 2

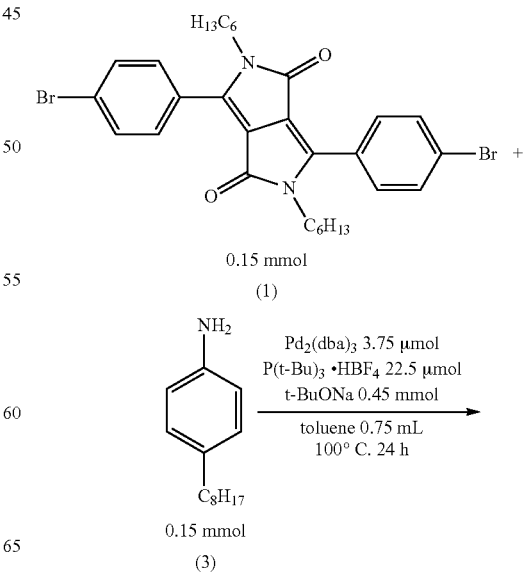

-continued

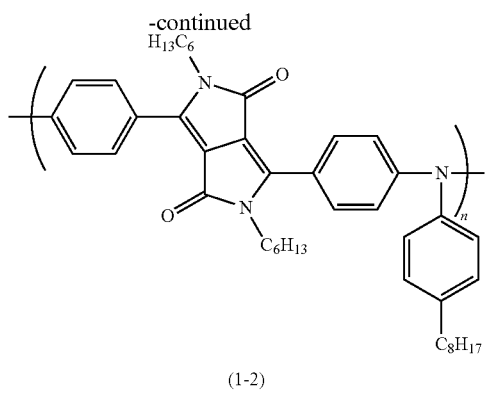
(1-2)

The same procedures as in Example 1 were carried out except that 30.8 mg (0.15 millimoles) of 4-n-octylaniline (3) was used in place of 72.7 mg (0.15 millimoles) of N,N'-bis(4-n-octylphenyl)-1,4-phenylenediamine (2), that the amount of toluene was changed from 3.0 mL to 0.75 mL, and that the reaction time was changed from 3 days to 24 hours, in Example 1, respectively, to give a purple polymer dye (1-2) (solid, 86.8 mg, yield: 88%). In addition, the polymer dye obtained had a number-average molecular weight of 5,300, and a weight-average molecular weight of 18,100.

Figure 2:
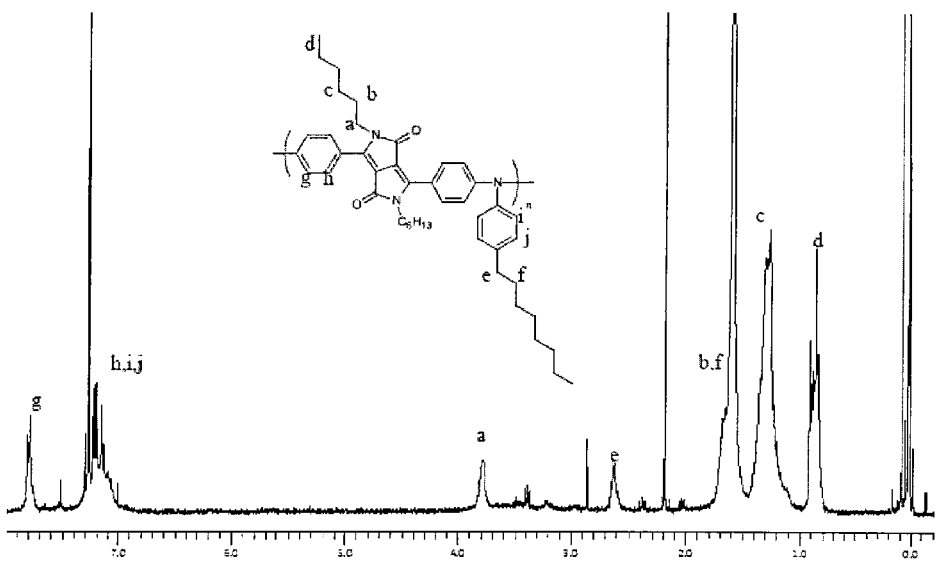
[FIG. 2] A $^1$H NMR spectrum of a polymer dye (1-2) obtained in Example 2.

The structure of the resulting polymer dye (1-2) was identified according to $^1$H NMR in the same manner as in Example 1. The $^1$H NMR spectrum of the polymer dye (1-2) is shown in FIG. 2.

$^1$H NMR (CDCl$_3$, 400 MHz) δ 7.79 (d, J=8.2, 4H, DPP), 7.22 (d, 2H, Ar), 7.21 (d, 4H, DPP), 7.12 (d, 2H, Ar), 3.78 (br, 4H, N—CH$_2$), 2.62 (t, J=8.2 Hz, 4H, Ar—CH$_2$), 1.65 (br, 8H, N—CH$_2$—CH$_2$, Ar—CH$_2$—CH$_2$), 1.28-1.20 (br, 22H, CH$_2$), 0.89-0.83 (m, 9H, CH$_3$)

Example 3

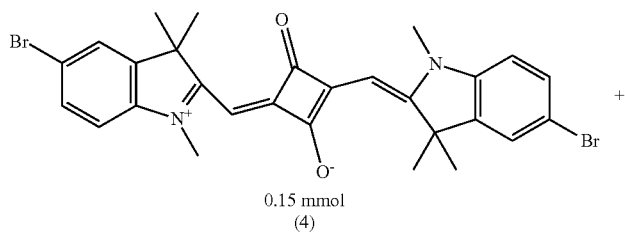
0.15 mmol
(4)

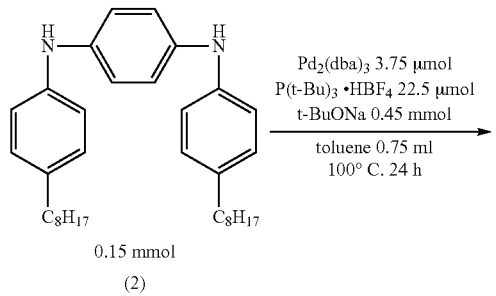
0.15 mmol
(2)

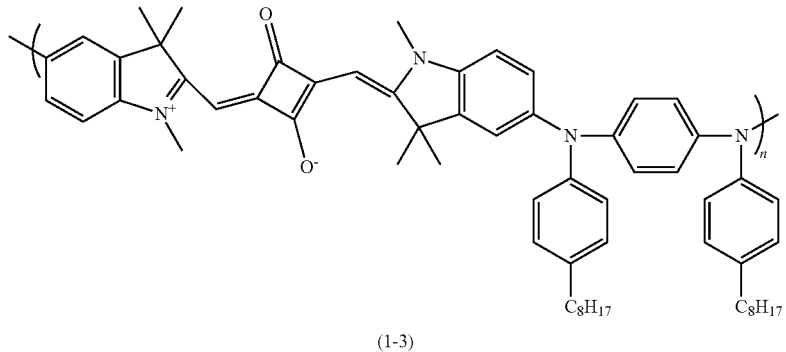
(1-3)

The same procedures as in Example 1 were carried out except that 87.4 mg (0.15 millimoles) of a squalene derivative (4) was used in place of 92.2 mg (0.15 millimoles) of the diketopyrrolopyrrole derivative (1), that the amount of toluene was changed from 3.0 mL to 0.75 mL, and that the reaction time was changed from 3 days to 24 hours, in Example 1, respectively, to give a blue-green polymer dye (1-3) (solid, 94.0 mg). The yield of the resulting polymer dye was 69% based on the squalene derivative used. In addition, the polymer dye obtained had a number-average molecular weight of 6,300, and a weight-average molecular weight of 18,500.

Figure 3:
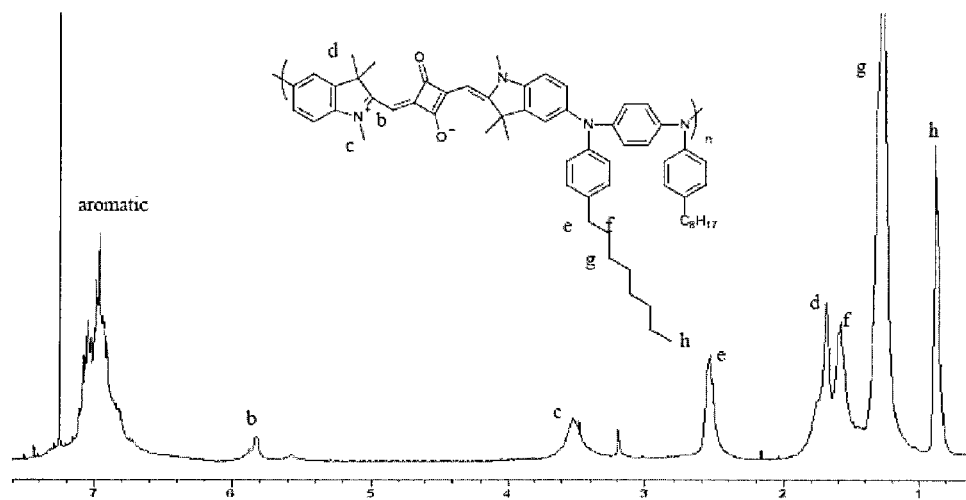
[FIG. 3] A $^1$H NMR spectrum of a polymer dye (1-3) obtained in Example 3.

The structure of the resulting polymer dye (1-3) was identified according to $^1$H NMR in the same manner as in Example 1. The $^1$H NMR spectrum of the polymer dye (1-3) is shown in FIG. 3.

$^1$H NMR (CDCl$_3$, 400 MHz) δ 7.08-6.90 (m, 18H, aromatic group), 5.93-5.79 (br, 2H, alkene), 3.65-3.38 (br, 6H, N—CH$_3$), 2.62-2.44 (m, 4H-1, Ar—CH$_2$), 1.74-1.65 (br, 12H, squalene-CH$_3$), 1.65-1.54 (br, 4H, Ar—CH$_2$—CH$_2$), 1.39-1.16 (br, 20H, CH$_2$), 0.91-0.80 (m, 6H, CH$_3$)

Example 4

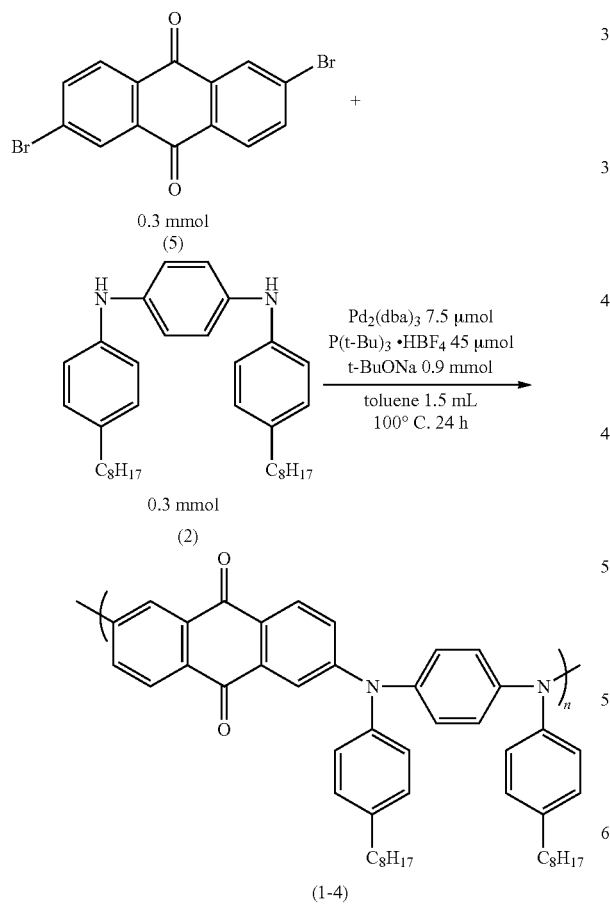

A 5 mL four-neck flask equipped with a condensing tube, a thermometer, and a stirrer was charged with 109.8 mg (0.30 millimoles) of an anthraquinone derivative (5), 145.2 mg (0.30 millimoles) of N,N'-bis(4-n-octylphenyl)-1,4-phenylenediamine (2), 6.9 mg (7.5 micromoles) of tris(dibenzylidene acetone)dipalladium(0) (Pd$_2$(dba)$_3$), 13.1 mg (45.0 micromoles) of tri-tert-butylphosphine tetrafluoroborate (P(t-Bu)$_3$·HBF$_4$), 86.4 mg (0.90 millimoles) of sodium-tert-butoxide (t-BuONa) and 1.50 mL of toluene. Next, the contents were heated to 100° C. under a nitrogen atmosphere, and the components were reacted at the same temperature for 24 hours. The liquid reaction mixture was then cooled to room temperature, and poured to 20 mL of methanol, to precipitate out a polymer. Thereafter, the precipitates were separated by filtration, and washed sequentially with EDTA, pure water, methanol, and hexane, and the washed precipitates were dried under a reduced pressure, to give a brown polymer dye (1-4) (solid, 129.2 mg). The yield of the resulting polymer dye was 63% based on the anthraquinone derivative used. In addition, the resulting polymer dye had a number-average molecular weight of 2,600, and a weight-average molecular weight of 4,000.

Figure 4:
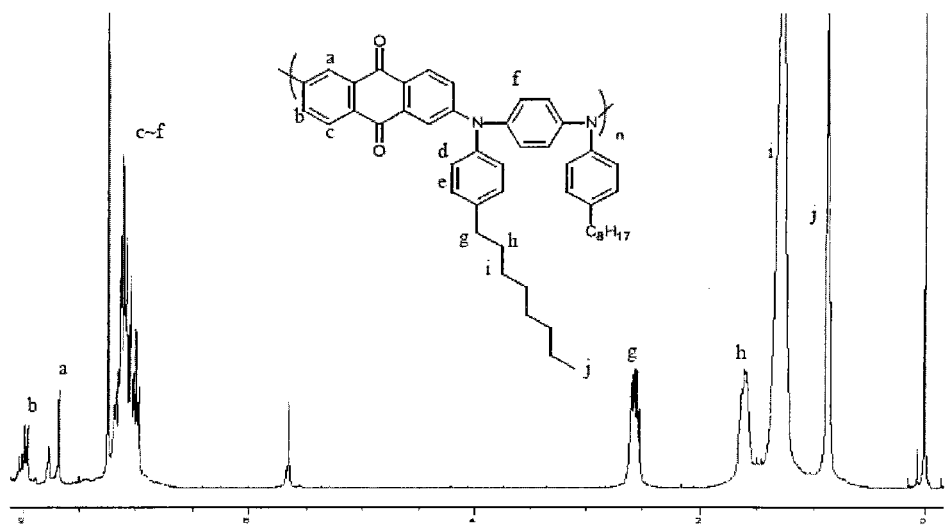
[FIG. 4] A $^1$H NMR spectrum of a polymer dye (1-4) obtained in Example 4.

The structure of the resulting polymer dye (1-4) was identified according to $^1$H NMR in the same manner as in Example 1. The $^1$H NMR spectrum of the polymer dye (1-4) is shown in FIG. 4.

$^1$H NMR (CDCl$_3$, 400 MHz) δ 8.10-7.93 (m, 2H, anthraquinone), 7.82-7.65 (m, 2H, anthraquinone), 7.21-6.98 (m, 14H, anthraquinone, phenylenediamine), 2.61-2.53 (m, 4H, Ar—CH$_2$), 1.67-1.57 (br, 4H, Ar—CH$_2$—CH$_2$), 1.34-1.26 (br, 20H, CH$_2$), 0.92-0.85 (m, 6H, CH$_3$)

Example 5

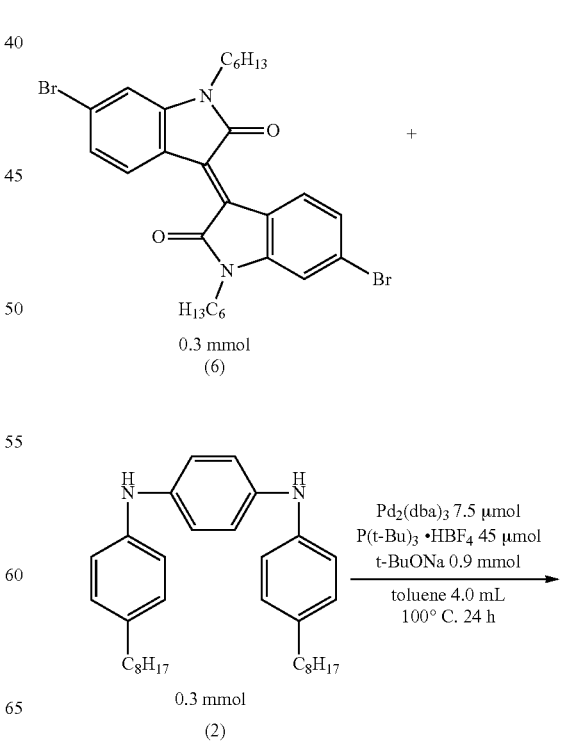

-continued

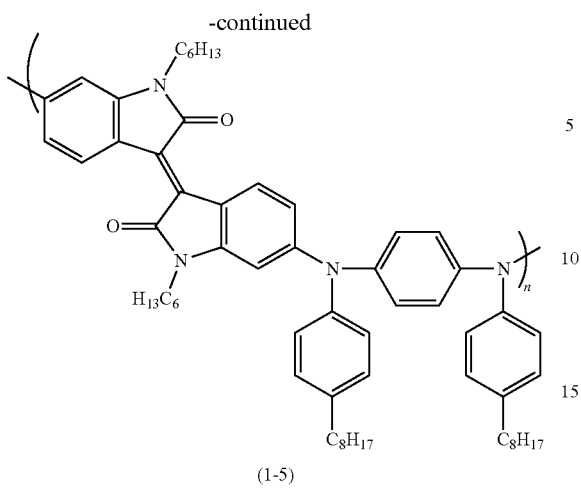

(1-5)

The same procedures as in Example 4 were carried out except that 176.5 mg (0.30 millimoles) of an isoindigo derivative (6) was used in place of 109.8 mg (0.30 millimoles) of the anthraquinone derivative (5), and that 4.0 mL of toluene was used in place of 1.50 mL of toluene, in Example 4, to give a deep blue polymer dye (1-5) (solid, 196.5 mg). The yield of the resulting polymer dye was 72% based on the isoindigo derivative used. In addition, the polymer dye obtained had a number-average molecular weight of 6,300, and a weight-average molecular weight of 47,700.

Figure 5:
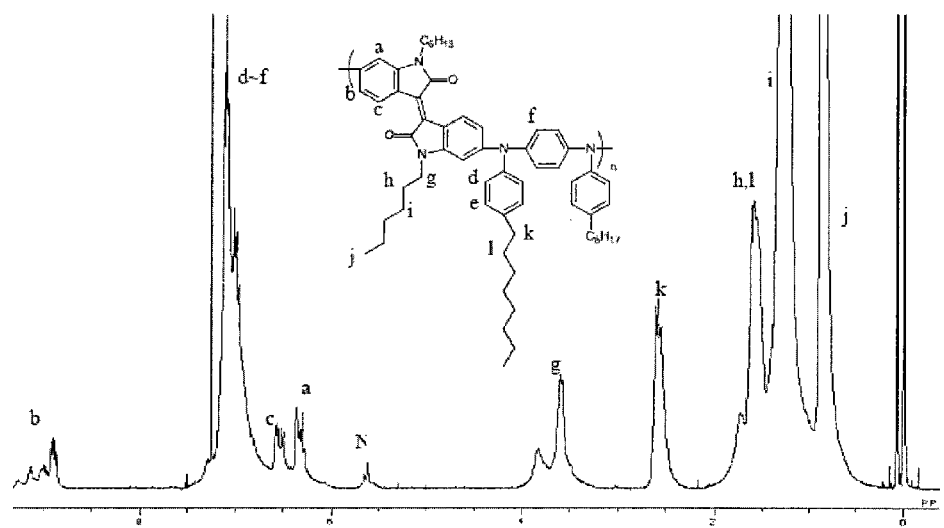
[FIG. 5] A $^1$H NMR spectrum of a polymer dye (1-5) obtained in Example 5.

The structure of the resulting polymer dye (1-5) was identified according to $^1$H NMR in the same manner as in Example 1. The $^1$H NMR spectrum of the polymer dye (1-5) is shown in FIG. 5.

$^1$H NMR (CDCl$_3$, 400 MHz) δ 9.32-8.75 (br, 2H, isoindigo), 7.20-6.92 (br, 12H, phenylenediamine), 6.59-6.39 (br, 2H, isoindigo), 6.38-6.21 (br, 2H, isoindigo), 4.10-3.43 (br, 4H, N—CH$_2$), 2.68-2.40 (br, 4H, Ar—CH$_2$), 1.68-1.46 (br, 8H, N—CH$_2$—CH$_2$, Ar—CH$_2$—CH$_2$), 1.45-1.18 (br, 32H, CH$_2$), 0.94-0.77 (m, 12H, CH$_3$)

Example 6

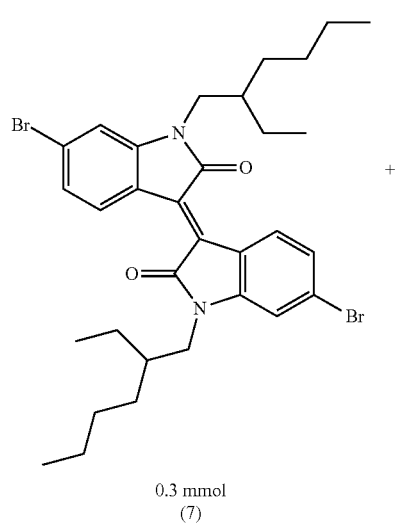

0.3 mmol
(7)

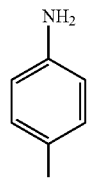
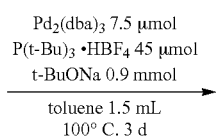

0.3 mmol
(3)

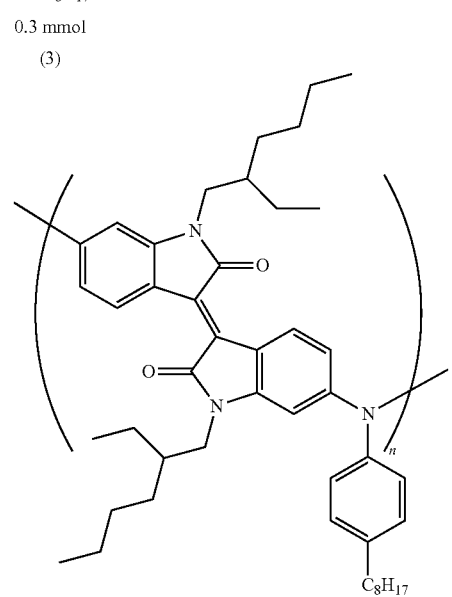

(1-6)

The same procedures as in Example 4 were carried out except that 194.3 mg (0.30 millimoles) of an isoindigo derivative (7) was used in place of 109.8 mg (0.30 millimoles) of the anthraquinone derivative (5), that 61.6 mg (0.3 millimoles) of 4-n-octylaniline (3) was used in place of 145.2 mg (0.30 millimoles) of N,N'-bis(4-n-octylphenyl)-1,4-phenylenediamine (2), and that the reaction time was changed from 24 hours to 3 days, in Example 4, to give a deep blue polymer dye (1-6) (solid, 137.2 mg). The yield of the resulting polymer dye was 64% based on the isoindigo derivative used. In addition, the polymer dye obtained had a number-average molecular weight of 8,000, and a weight-average molecular weight of 14,900.

Figure 6:
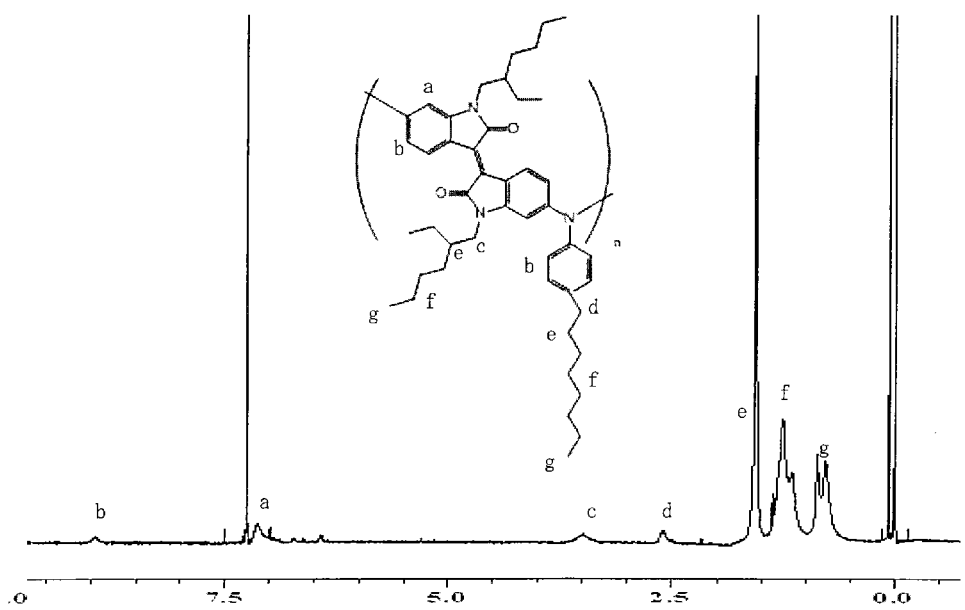
[FIG. 6] A $^1$H NMR spectrum of a polymer dye (1-6) obtained in Example 6.

The structure of the resulting polymer dye (1-6) was identified according to $^1$H NMR in the same manner as in Example 1. The $^1$H NMR spectrum of the polymer dye (1-6) is shown in FIG. 6.

$^1$H NMR (CDCl$_3$, 400 MHz) δ 8.94 (br, 2H, isoindigo), 7.13 (br, 8H, isoindigo, Ar), 3.49 (br, 4H, N—CH$_2$), 2.60 (br, 2H, Ar—CH$_2$), 1.57 (br, 4H, CH, Ar—CH$_2$—CH$_2$), 1.29 (br, 26H, CH$_2$), 0.87-0.79 (br, 15H, CH$_3$)

Example 7

A 5-mL eggplant-shaped flask was charged with 200 mg of the polymer dye (1-1) obtained in Example 1 and 800 mg of chloroform to dissolve, to give 1.00 g of a homogenous solution.

Next, a chloroform solution of the polymer dye was poured onto a petri dish, and dried at 25° C. for 240 minutes, to give a film of a copper red metallic texture. The thickness of the film is shown in Table 1.

Here, the thickness of the resulting film was measured with a film thickness measurement instrument (manufactured by Kabushiki Kaisha Kosaka Kenkyusho, trade name: "bisai keijo sokuteiki (fine shaped measurement instrument)" surfcorder ET3000i).

Example 8

The same procedures as in Example 7 were carried out except that the polymer dye (1-2) obtained in Example 2 was used in place of the polymer dye (1-1) obtained in Example 1, in Example 7, to give a film of a copper red metallic texture.

Example 9

The same procedures as in Example 7 were carried out except that the polymer dye (1-3) obtained in Example 3 was used in place of the polymer dye (1-1) obtained in Example 1, in Example 7, to give a film of a blue metallic texture.

Example 10

The same procedures as in Example 7 were carried out except that the polymer dye (1-4) obtained in Example 4 was used in place of the polymer dye (1-1) obtained in Example 1, and that 800 mg of tetrahydrofuran was used in place of 800 mg of chloroform, in Example 7, to give a film of a green metallic texture.

Example 11

The same procedures as in Example 7 were carried out except that the polymer dye (1-5) obtained in Example 5 was used in place of the polymer dye (1-1) obtained in Example 1, in Example 7, to give a film of a purple metallic texture.

Example 12

The same procedures as in Example 7 were carried out except that the polymer dye (1-6) obtained in Example 6 was used in place of the polymer dye (1-1) obtained in Example 1, in Example 7, to give a film of a purple metallic texture.

TABLE 1

| Ex. | Structural Formula of Polymer Dye | Thickness of Film (μm) | Color |
|---|---|---|---|
| 7 | [polymer dye structure with diketopyrrolopyrrole core bearing two $C_6H_{13}$ N-substituents, connected via phenyl linker to bis(triarylamine) unit with $C_8H_{17}$ substituents] | 102 | Copper Red |
| 8 | [polymer dye structure with diketopyrrolopyrrole core bearing two $C_6H_{13}$ N-substituents, connected via phenyl linker to triarylamine unit with $C_8H_{17}$ substituent] | 63 | Copper Red |
| 9 | [polymer dye structure with squaraine/indoline core connected to bis(triarylamine) unit with $C_8H_{17}$ substituents] | 52 | Blue |

TABLE 1-continued

| Ex. | Structural Formula of Polymer Dye | Thickness of Film (μm) | Color |
|---|---|---|---|
| 10 | 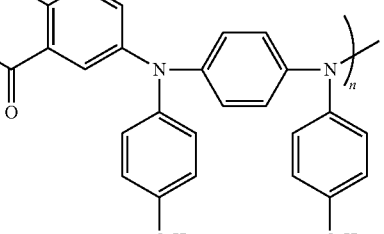 | 50 | Green |
| 11 | 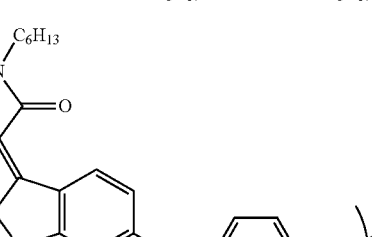 | 21 | Purple |
| 12 | 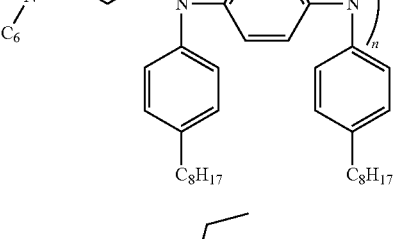 | 72 | Purple |

It can be seen from the results of Table 1 that all the films produced by using the polymer dyes obtained in Examples have a metallic luster. In addition, it is evident that a metallic luster of different colors is realized by the dye incorporated therein.

Industrial Applicability

The polymer dye of the present invention can be used for various industrial materials for use in automobiles, communication instruments, such as mobile phones, PDA, remote controllers, mobile information terminals, electronic dictionaries, and electronic organizers, home electric appliances, construction parts and the like.

The invention claimed is:

1. A polymer dye having a repeating unit represented by the formula (I):

wherein each of $R^1$, $R^2$, and $R^3$, which may be identical or different, is a monocyclic carbocyclic group which may have a substituent, a condensed polycyclic carbocyclic group which may have a substituent, a monocyclic heterocyclic group which may have a substituent, or a condensed polycyclic heterocyclic group which may have a substituent, wherein $R^1$ is a divalent group, and $R^2$ and $R^3$ are monovalent groups; D is an organic dye group; and n is an integer of from 0 to 10, wherein the polymer dye has a number-average molecular weight of from 500 to 500,000, and wherein in the formula (I) the organic dye group is at least one divalent group selected from the group consisting of diketopyrrolopyrrole, squalene, anthraquinone, and isoindigo.

2. The polymer dye according to claim 1, wherein the polymer dye has a repeating unit represented by the formula (Ia):

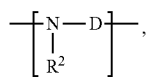  (Ia)

wherein n is 0 in the formula (I).

3. The polymer dye according to claim 1, wherein the polymer dye has a repeating unit represented by the formula (Ib):

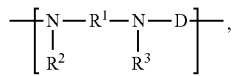  (Ib)

wherein n is 1 in the formula (I).

4. The polymer dye according to claim 1, wherein in the formula (I) $R^1$ is a monocyclic carbocyclic group which may have a substituent.

5. The polymer dye according to Claim 1, wherein in the formula (I) $R^2$ is a monocyclic carbocyclic group which may have a substituent.

6. The polymer dye according to claim 1, wherein in the formula (I) $R^3$ is a monocyclic carbocyclic group which may have a substituent.

7. A method for producing a polymer dye having a repeating unit represented by the formula (I):

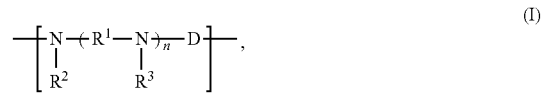  (I)

wherein each of $R^1$, $R^2$, and $R^3$, which may be identical or different, is a monocyclic carbocyclic group which may have a substituent, a condensed polycyclic carbocyclic group which may have a substituent, a monocyclic heterocyclic group which may have a substituent, or a condensed polycyclic heterocyclic group which may have a substituent, wherein $R^1$ is a divalent group, and $R^2$ and $R^3$ are monovalent groups; D is an organic dye group; and n is an integer of from 0 to 10, wherein the polymer dye has a number-average molecular weight of from 500 to 500,000, the method comprises:

reacting an amino compound represented by the formula (II):

  (II)

and a dihalogeno-compound represented by the formula (III):

X-D-X  (III), wherein X is a halogen atom, in the presence of a catalyst containing a palladium compound and a phosphine compound, and a base.

8. A film comprising the polymer dye according to claim 1.

* * * * *